UNITED STATES PATENT OFFICE.

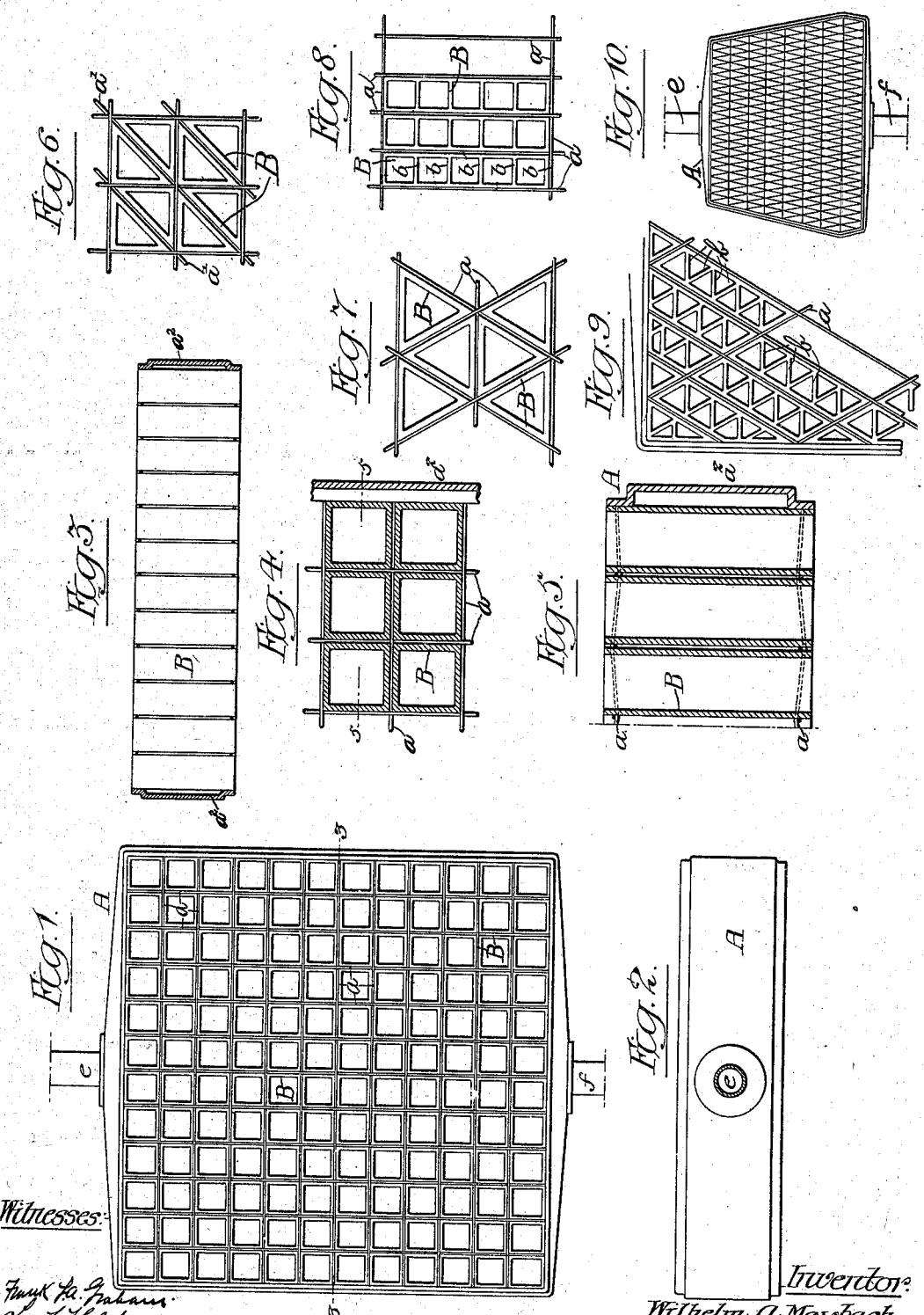

WILHELM A. MAYBACH, OF CANNSTADT, GERMANY, ASSIGNOR TO DAIMLER MANUFACTURING COMPANY, OF NEW YORK, N. Y., A CORPORATION OF NEW YORK.

COOLING AND CONDENSING APPARATUS.

SPECIFICATION forming part of Letters Patent No. 709,416, dated September 16, 1902.

Application filed March 28, 1901. Serial No. 53,341. (No model.)

*To all whom it may concern:*

Be it known that I, WILHELM AUGUST MAYBACH, a subject of the Emperor of Germany, and a resident of Cannstadt, in the Kingdom of Würtemberg, Germany, have invented certain Improvements in Cooling and Condensing Apparatus, of which the following is a specification.

The object of my invention is to provide a cooling and condensing apparatus especially adapted for explosion-motors whereby very thin films of water are brought into contact with the cooling-surface, so that a great quantity of water can be cooled in a very small apparatus.

My invention is especially applicable to the cooling apparatus used on automobile explosion-motors.

Referring to the accompanying drawings, Figure 1 is a front view of one form of cooling and condensing apparatus. Fig. 2 is a plan view of Fig. 1. Fig. 3 is a section on the line 3 3, Fig. 1. Fig. 4 is an enlarged sectional view of a portion of Fig. 1. Fig. 5 is a section on the line 5 5, Fig. 4. Figs. 6, 7, 8, and 9 are views illustrating different forms of tubes that may be used; and Fig. 10 is a view showing the preferred form of cooling apparatus used on automobiles.

The cooling and condensing apparatus illustrated in Figs. 1 to 5, inclusive, consists of a frame A having a network $a$ at each end, as shown in Fig. 5. This network in the present instance consists of wires which may be interwoven, as shown, or may simply be arranged to cross each other. The wires are so strung on the frame as to form a series of quadrangular openings of uniform size.

B represents tubes quadrangular in cross-section, which snugly fit the quadrangular openings formed by the wire mesh. These tubes, as clearly shown in Figs. 3 and 4, extend through the quadrangular openings formed by the interlacing of the wires $a\ a$, and the wires space these tubes sufficiently so that there will be very narrow vertical and horizontal channels between each of the tubes. When the tubes are in position, the ends of the tubes are soldered or otherwise secured to the wires forming the screen or network, and a cooling vessel is thereby formed which is water-tight and so formed that when water is passed into the apparatus through the pipe $e$ it circulates throughout the entire body of the cooling apparatus and escapes through the pipe $f$. The water as it passes through the apparatus must pass in very thin streams between the two surfaces of each tube, as shown clearly in Fig. 4, so that an extended cooling-surface is thus afforded with comparatively little expense.

The water after it passes from the cooling apparatus is cooled sufficiently for the purpose for which it is intended, and the air can pass rapidly through the apparatus without interruption.

The wires forming the screen may be round or flat, as desired, and may be of any weight or thickness, depending upon the size of the cooling apparatus and the amount of space desired between each tube.

The tubes B may be spaced in any other manner besides that shown in the drawings, and instead of forming the screen by a wire network the screen can be produced by punching holes in a sheet of metal and fastening the tubes to this frame by expanding them, or the pipes may be flanged at each end and secured together at the ends, so as to form narrow channels between the pipes. By each one of these means I obtain the result—that is, the separation of the tubes by narrow channels through which the water to be cooled can pass. The tubes in the present instance being quadrangular in cross-section enable me to make both vertical and horizontal narrow channels, and all the channels will be uniform.

Instead of using a quadrangular tube, as shown in Fig. 1, triangular tubes may be used, as shown in Fig. 6. In this instance a diagonal wire $a'$ is used, and thus the triangular tubes are separated, so as to form narrow passage-ways for the passage of the liquid to be cooled.

In Fig. 7 I have shown another form, in which triangular tubes are used, and in Fig. 8 I have shown a form in which the tubes B are divided by a series of partitions $b$. In this instance the wires simply separate each tube-section, forming long vertical and short transverse channels.

In Fig. 9 I have shown a modification in which the principle shown in Fig. 8 is used, only the partitions in this instance form triangular passages instead of the quadrangular passages shown in Fig. 8.

In Fig. 10 I have shown the external form of a cooling and condensing apparatus especially adapted for automobile use. It will be seen that the end portions of the frame A are formed so as to leave a space between these and the said tubes, thus allowing water entering the apparatus through the pipes e to distribute itself uniformly through the various passages, said water also passing between the sides of the frame and the tubes extending along said sides, being finally collected and passing out through the opening f.

In the construction shown in Figs. 8 and 9 where each tube is divided into a series of spaces by partitions b these partitions will act as conductors and will further act as a means for strengthening the tubes.

It will be understood that the apparatus can be used for cooling any fluids; but it is especially adapted for automobile work.

By the construction above described I am enabled to provide a cooling and condensing apparatus which will take up very little room and which will have a very large surface over which the fluid to be cooled can flow and there is no obstruction to the free passage of the air through the apparatus.

I claim as my invention—

1. The combination of a frame having screens at each end formed by wires crossing each other and tubes extending from one screen to the other, said tubes being secured to the wires and forming a chamber for the fluid to be cooled, substantially as described.

2. The combination of a frame having an inlet-pipe at one end, and an outlet-pipe at the other end, a series of wires crossing each other at each end of the frame forming supports, with prismatically-shaped tubes extending from one side of the frame to the other and separated by the wires, the wires spacing the tubes so as to form narrow channels for the passage of fluid through the apparatus, substantially as described.

3. The combination in a cooling apparatus of a frame, a screen at each end thereof formed by wires crossing each other, the meshes of the screen so formed being quadrangular in form with quadrangular tubes extending through one screen to the other and secured to the same, the side members of the frame extending a certain distance away from the said tubes thereby forming a distributing-chamber, and inlets and outlets to the chamber thus formed, substantially as described.

In testimony whereof I have signed my name to this specification in the presence of two subscribing witnesses.

WILHELM A. MAYBACH.

Witnesses:
WM. HAHN,
HY. REICHARDT.